(12) United States Patent
Rarog-Pilecka et al.

(10) Patent No.: US 9,272,906 B2
(45) Date of Patent: Mar. 1, 2016

(54) METHOD FOR PURIFICATION OF AMMONIA, MIXTURES OF NITROGEN AND HYDROGEN, OR NITROGEN, HYDROGEN AND AMMONIA

(71) Applicants: Politechnika Warszawska, Warsaw (PL); Slawomir Andrzej Maculewicz, Pruszkow (PL)

(72) Inventors: Wioletta Rarog-Pilecka, Lowicz (PL); Slawomir Podsiadlo, Warsaw (PL); Dariusz Lenkiewicz, Pruszkow (PL); Slawomir Andrzej Maculewicz, Pruszkow (PL)

(73) Assignee: POLITECHNIKA WARSZAWSKA, Warszawa (PL)

( * ) Notice: Subject to any disclaimer, the term of this patent is extended or adjusted under 35 U.S.C. 154(b) by 0 days.

(21) Appl. No.: 14/561,677

(22) Filed: Dec. 5, 2014

(65) Prior Publication Data

US 2015/0083972 A1 Mar. 26, 2015

Related U.S. Application Data

(63) Continuation of application No. PCT/PL2013/000075, filed on Jun. 7, 2013.

(30) Foreign Application Priority Data

Jun. 8, 2012 (PL) .......................................... 399466

(51) Int. Cl.
*B01D 53/02* (2006.01)
*C01B 3/56* (2006.01)
(Continued)

(52) U.S. Cl.
CPC . *C01B 3/56* (2013.01); *C01B 3/025* (2013.01); *C01B 21/0455* (2013.01);
(Continued)

(58) Field of Classification Search
CPC ............ C01B 21/0455; C01B 21/0461; C01B 2203/042; C01B 2203/048; C01B 2203/0495; C01B 2203/068; C01B 2203/147; C01B 2210/0062; C01B 2210/007; C01B 3/025; C01B 3/56; C01C 1/024
See application file for complete search history.

(56) References Cited

U.S. PATENT DOCUMENTS 3,432,265 A * 3/1969 Sinclair ................... C01B 3/025
422/148
4,075,306 A 2/1978 Muromura
(Continued)

FOREIGN PATENT DOCUMENTS

DE 10261817 A1 7/2004
EP 1541218 A1 6/2005
(Continued)

OTHER PUBLICATIONS

International Search Report for International Application No. PCT/PL2013/000075, mailed Nov. 19, 2013, with written opinion.
(Continued)

*Primary Examiner* — Christopher P Jones
(74) *Attorney, Agent, or Firm* — Myers Wolin, LLC

(57) ABSTRACT

Method for purification of ammonia or mixtures of nitrogen and hydrogen, or nitrogen, hydrogen and ammonia, where ammonia or a mixture of gases under pressure of from 0.1 to 25 MPa is passed through a column packed with aluminum oxide with a large specific surface area, the ammonia or mixture of gases is then passed through a column packed with CaO, NaOH, KOH or an NaOH/KOH melt, separately or in a mixture, at 20 to 70° C. and under pressure of from 0.1 to 25 MPa, and the ammonia or mixture of gases is passed through a column packed with activated carbon having a specific area of 100-3000 m²/g with sodium, potassium, caesium, magnesium, calcium, strontium, barium or cerium nitrates(V) or nitrates(III) deposited on its surface, separately or in a mixture.

7 Claims, 1 Drawing Sheet

(51) Int. Cl.
*C01B 21/04* (2006.01)
*C01B 3/02* (2006.01)
*C01C 1/02* (2006.01)

(52) U.S. Cl.
CPC ............ *C01B 21/0461* (2013.01); *C01C 1/024* (2013.01); *C01B 2203/042* (2013.01); *C01B 2203/048* (2013.01); *C01B 2203/0495* (2013.01); *C01B 2203/068* (2013.01); *C01B 2203/147* (2013.01); *C01B 2210/007* (2013.01); *C01B 2210/0062* (2013.01)

(56) References Cited

U.S. PATENT DOCUMENTS

| | | |
|---|---|---|
| 7,001,490 B2 | 2/2006 | Wostbrock et al. |
| 7,297,181 B2 | 11/2007 | Zhou et al. |
| 2001/0010286 A1 | 8/2001 | Wostbrock et al. |
| 2002/0100366 A1* | 8/2002 | Watanabe ............ B01D 53/46 95/116 |
| 2005/0120877 A1 | 6/2005 | Wu et al. |
| 2006/0005704 A1 | 1/2006 | Zhou et al. |

FOREIGN PATENT DOCUMENTS

| | | |
|---|---|---|
| WO | 97/06104 A1 | 2/1997 |
| WO | 02/45846 A1 | 6/2002 |
| WO | 2012/132678 A1 | 10/2012 |

OTHER PUBLICATIONS

Search Report from the Patent Office of the Republic of Poland for Polish Application No. P.399 466, dated Nov. 6, 2012.
W. Bobrownicki, S. Pawlikowski, "Technologia zwiazkow azotowych", WNT, Warsaw 1974.
"Purifier TM (Cyrogenic Gas Purification System)" downloaded from http://www.kbr.com on Nov. 26, 2014.

* cited by examiner

METHOD FOR PURIFICATION OF AMMONIA, MIXTURES OF NITROGEN AND HYDROGEN, OR NITROGEN, HYDROGEN AND AMMONIA

CROSS REFERENCE TO RELATED APPLICATIONS

This application is a continuation under 35 U.S.C. §120 of International Application PCT/PL2013/000075, filed Jun. 7, 2013, which claims priority to Polish Application PL399466, filed Jun. 8, 2012, the contents of each of which are incorporated by reference herein.

FIELD OF THE INVENTION

The invention relates to a method for purification of ammonia, mixtures of nitrogen and hydrogen, or nitrogen, hydrogen and ammonia to high purity.

BACKGROUND

Over the last few decades, scientific studies resulted in many discoveries in the field of electronics pertaining to the application of new materials. Nitrides of aluminium, gallium and indium are an especially attractive group of chemical compounds to be used in new electronic technologies. In the processes of synthesis of the said nitrides, ammonia with particularly high purity—less than 0.1 ppm of impurities—is used. On the other hand, a need arises for purification of the syngas (hydrogen and nitrogen) stream in ammonia synthesis, in which catalysts with higher efficiency than that of the conventional iron catalyst are used. Such catalysts are much more sensitive to impurities present in the syngas stream.

Purity of ammonia is connected both with purity of the syngas used for production of ammonia and with methods for purification of raw ammonia.

Methods for obtaining a syngas with proper purity (mixture of $H_2$ and $N_2$) are known and described in many sources of literature [W. Bobrownicki, S. Pawlikowski, "Technologia związków azotowych", WNT, Warsaw 1974; Information materials of Kellogg Brown & Root, http://www.kbr.com, dated May 15, 2012]. Final purification of the fresh gas from water vapour and carbon oxides is carried out by adsorption on molecular sieves or washing of the gas with a stream of liquid ammonia or liquid nitrogen. The purity of these gas streams is sufficient to obtain technical ammonia on a large commercial scale, but completely unsatisfactory for application of the obtained $NH_3$ in electronics. For this type of application, it is necessary to remove such impurities as $H_2O_{(g)}$, $CO_x$, $CH_4$, $O_2$ and Ar from ammonia.

In order to purify ammonia to high purity, two basic methods are used. The older one consists in passing gaseous ammonia containing 80 ppm of impurities under atmospheric pressure through liquid ammonia with dissolved metallic sodium. After purification, $NH_3$ contains 0.6 ppm of impurities in the form of oxygen-containing compounds [U.S. Pat. No. 4,075,306]. The other method for obtaining high-purity ammonia is fractional distillation of liquid ammonia under a pressure of 2-30 MPa. Ammonia with 99.99% purity was purified to a level of 10 ppm of impurities [U.S. Pat. No. 7,001,490]. of liquid ammonia may be preceded by stages of hydrocarbons and water removal by adsorption. The adsorption process is carried out using a known bed, e.g. granulated activated carbon for removal of hydrocarbons and calcium sulfate(VI) for removal of water. Such a process is known from the patent description U.S. Pat. No. 7,297,181, according to which ammonia with a purity of 99.9995% has been obtained.

Use of metallic sodium in the first method practically precludes its application in the field of electronics, because sodium is an element considered exceptionally inadvisable in semiconductor materials. In the next two methods, a process of distillation is used, requiring complex equipment and using a significant amount of energy.

The goal of the invention was to provide a method which allows for obtaining high-purity ammonia, technologically convenient on a large scale, and enables efficient purification of both syngas and impure ammonia.

SUMMARY

A method for purification of ammonia or mixtures of nitrogen and hydrogen, or nitrogen, hydrogen and ammonia, where ammonia or a mixture of gases under pressure of from 0.1 to 25 MPa is passed through a column packed with aluminium oxide with a large specific surface area, the ammonia or mixture of gases is then passed through a column packed with CaO, NaOH, KOH or an NaOH/KOH melt, separately or in a mixture, at 20 to 70° C. and under pressure of from 0.1 to 25 MPa, and the ammonia or mixture of gases is passed through a column packed with activated carbon having a specific area of 100-3000 $m^2$/g with sodium, potassium, caesium, magnesium, calcium, strontium, barium or cerium nitrates(V) or nitrates(III) deposited on its surface, separately or in a mixture. These steps being realized in a serial process at a gas stream flow rate in the range of 100 $dm^3$/h to 1000 $m^3$/h.

DETAILED DESCRIPTION OF THE PREFERRED EMBODIMENTS

Figure 1:
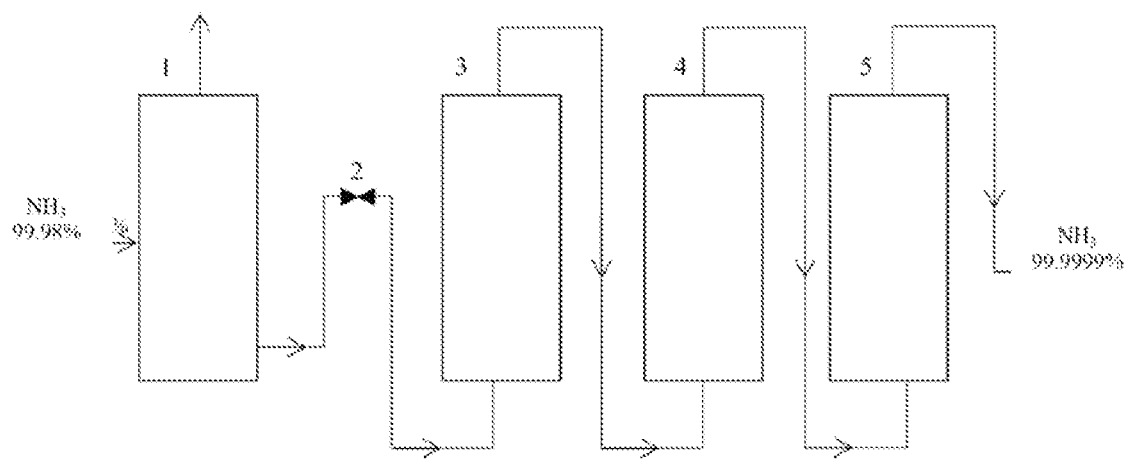
FIG. 1 is a block diagram of a system for a first realization of a method according to the invention.

The method for purification of ammonia, mixtures of nitrogen and hydrogen, or nitrogen, hydrogen and ammonia, according to the invention, is a multi-staged process, consisting of the following steps:
  a) ammonia or a mixture of gases under pressure of from 0.1 to 25 MPa is passed through a column packed with aluminium oxide with a large specific surface area, at room temperature, in order to bind oil residues;
  b) the ammonia or mixture of gases is then passed through a column packed with CaO, NaOH, KOH or an NaOH/KOH melt, separately or in a mixture, at 20 to 70° C. and under pressure of from 0.1 to 25 MPa, in order to preliminarily bind water vapour;
  c) next, the ammonia or mixture of gases is passed through a column packed with activated carbon having a specific area of 100-3000 $m^2$/g with sodium, potassium, caesium, magnesium, calcium, strontium, barium or cerium nitrates(V) or nitrates(III) deposited on its surface, separately or in a mixture, in order to remove a decisive majority of oxygen contained in the compounds that were not removed earlier (mainly $H_2O$ and CO);

the aforementioned steps being realised in a serial process at a gas stream flow rate in the range of 100 $dm^3$/h to 1000 $m^3$/h.

In the case when the method according to the invention is used for purification of ammonia, additionally a preliminary stage of methane removal from above the liquid ammonia is applied by removal of the gas from above the liquid in the amount of 1-100 dm$^3$/h.

In stages a) and b), ammonia, preferably decompressed to a pressure of from 0.1 to 0.8 MPa, is introduced to the columns.

In stage c), column packing activated before use with a stream of an inert gas (e.g. nitrogen) or hydrogen, or their mixture with a pressure of 0.1-25 MPa, at 250-700° C. is used.

During the purification cycle, in stage c), the mixture of gases is passed through a column, preferably under pressure of from 0.1 to 25 MPa at 170-425° C., while ammonia is passed through a column preferably under pressure of from 0.1 to 0.8 MPa at 170-425° C.

In stage a), aluminium oxide with a specific area not lower than 50 m$^2$/g is used for the column packing.

The column packing of stage a) may be regenerated by exclusion of the column from the flow and passing a stream of an inert gas (e.g. nitrogen) or hydrogen or a mixture of these gases through it at 200-700° C. The column packing of stage c) may be regenerated by exclusion of the column from the flow and passing a stream of an inert gas (e.g. nitrogen) or hydrogen or a mixture of these gases through it at 250-700° C.

The solution according to the invention allows for obtaining ammonia or mixtures of nitrogen and hydrogen, or nitrogen, hydrogen and ammonia, with a purity of 99.9999% using a technological apparatus with a simple construction and simultaneously using readily available chemical substances.

The method according to the invention is presented in more detail in embodiments. In all examples, measurements of ammonia purity were evaluated measuring the dew point in the gas.

Figure 2:
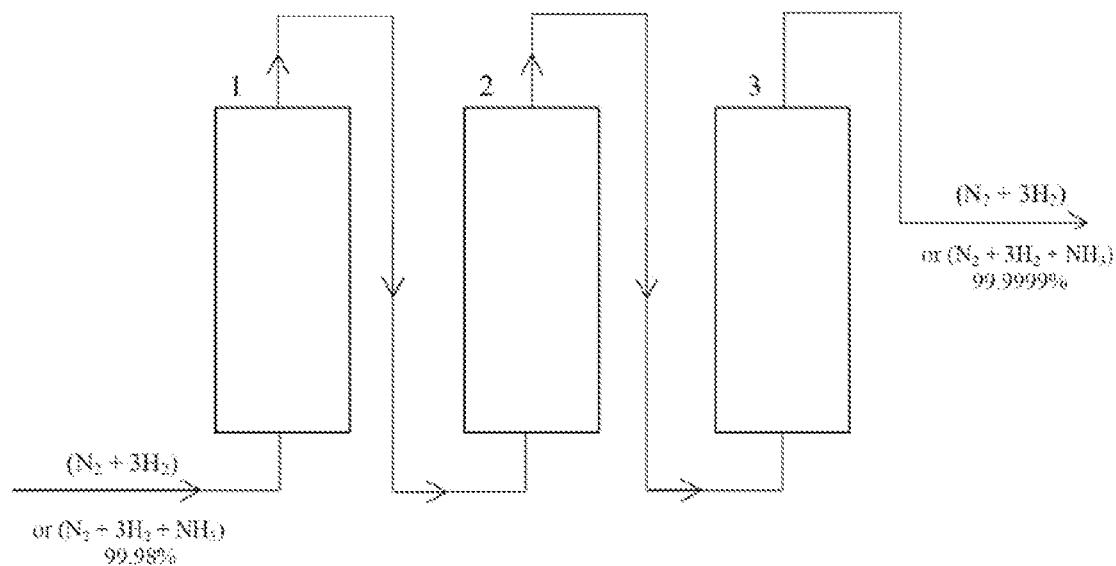
FIG. 2 is a block diagram of a system for a second realization of a method according to the invention.

Sets of columns for realisation of the method according to the invention are schematically shown in the embodiments in FIGS. 1 and 2.

Example 1

The system used is shown in FIG. 1. Technical liquid ammonia with a purity of 99.98% by wt. was purified. The gas was carried off at a rate of 30 dm$^3$/h from above liquid NH$_3$ in an intermediate tank (1) with a capacity of 1000 dm$^3$. Liquid ammonia from this tank was directed to decompression (2) and then, under pressure of 0.5 MPa, passed through a column (3) packed with aluminium oxide having a specific area of 90 m$^2$/g. Under the same pressure, the stream of ammonia was directed to a column (4) packed with CaO. The ammonia initially dried in this manner flowed through a column (5) with a carbon bed having a specific area of 500 m$^2$/g, saturated with a mixture of magnesium and calcium nitrates(V), which was dried and heated at 300° C. under a stream of a hydrogen-nitrogen mixture with a molar ratio of 3:1. In the process, a stream of ammonia with a flow rate of 500 dm$^3$/h containing less than 1 ppm of impurities was obtained.

Example 2

The system used is shown in FIG. 2. A mixture of nitrogen and hydrogen (with a molar ratio of 1:3) containing 150 ppm of impurities was purified. A stream of gases under pressure of 7.5 MPa was passed through a column (1) packed with aluminium oxide having a specific area of 150 m$^2$/g. Under the same pressure, the stream of gases was directed to a column (2) packed with CaO. The gases initially dried in this manner flowed at 290° C. through a column (3) with a carbon bed having a specific area of 800 m$^2$/g, saturated with calcium nitrate(V), which was dried and heated at 400° C. under a stream of nitrogen. In the process, a stream of gases with a flow rate of 300 dm$^3$/min containing less than 0.5 ppm of impurities was obtained.

Example 3

The system used is shown in FIG. 2. A gaseous mixture of nitrogen and hydrogen (with a molar ratio of 1:3) containing an additional 5% by vol. of ammonia was purified. The level of impurities in the mixture was 100 ppm. A stream of gases under pressure of 6 MPa was passed through a column (1) packed with aluminium oxide having a specific area of 100 m$^2$/g. Under the same pressure, the stream of gases was directed to a column (2) packed with CaO. The gases initially dried in this manner flowed through a column (3) with a carbon bed having a specific area of 1200 m$^2$/g, saturated with calcium nitrate(V), which was dried and heated at 250° C. under a stream of hydrogen and nitrogen mixture with a molar ratio of 1:3. In the process, a stream of gases with a flow rate of 200 dm$^3$/min and a composition the same as the one introduced containing less than 0.5 ppm of impurities was obtained.

What is claimed is:

1. A method for purification of ammonia or mixtures of nitrogen and hydrogen, or nitrogen, hydrogen and ammonia, using a step of hydrocarbons and water removal by adsorption, wherein:
   a) ammonia or a mixture of gases under pressure of from 0.1 to 25 MPa is passed through a column packed with aluminium oxide with a specific surface area not lower than 50 m$^2$/g,
   b) the ammonia or mixture of gases is then passed through a column packed with CaO, NaOH, KOH or an NaOH/KOH melt, separately or in a mixture, at 20 to 70° C. and under pressure of from 0.1 to 25 MPa,
   c) next, the ammonia or mixture of gases is passed at 170-425° C. through a column packed with activated carbon having a specific area of 100-3000 m.sup.2/g with sodium, potassium, caesium, magnesium, calcium, strontium, barium or cerium nitrates (V) or nitrates (III) deposited on its surface separately or in a mixture, and activated before use with a stream of an inert gas or hydrogen, or their mixture, with a pressure of 0.1-25 MPa and at 250-700° C.,
   the aforementioned steps being realised in a serial process at a gas stream flow rate in the range of 100 dm$^3$/h to 1000 m$^3$/h.

2. The method of claim 1, wherein for purification of ammonia, additionally a preliminary stage of methane removal from above liquid ammonia is applied by removal of the gas from above the liquid in the amount of 1-100 dm$^3$/h.

3. The method of claim 1, wherein in stage a) and b), ammonia under pressure of from 0.1 to 0.8 MPa is introduced to the columns.

4. The method of claim 1, wherein in stage c), a mixture of gases is passed through the column under pressure of from 0.1 to 25 MPa.

5. The method of claim 1 wherein in stage c), ammonia is passed through the column under pressure of from 0.1 to 0.8 MPa.

6. The method of claim 1, wherein the column packing of stage a) is regenerated by passing a stream of an inert gas or hydrogen or a mixture of these gases through it at 200-700° C.

7. The method of claim 1, wherein the column packing of stage c) is regenerated by passing a stream of an inert gas or hydrogen or a mixture of these gases through it at 250-700° C.

\* \* \* \* \*